3,376,951
MEANS FOR LUBRICATION OF GAS
VANE MOTORS
Robert H. Bosworth, Morristown, and Edward A. Cohen, Roselle, N.J., assignors to The Bendix Corporation, Teterboro, N.J., a corporation of Delaware
Filed Dec. 29, 1964, Ser. No. 421,919
11 Claims. (Cl. 184—6)

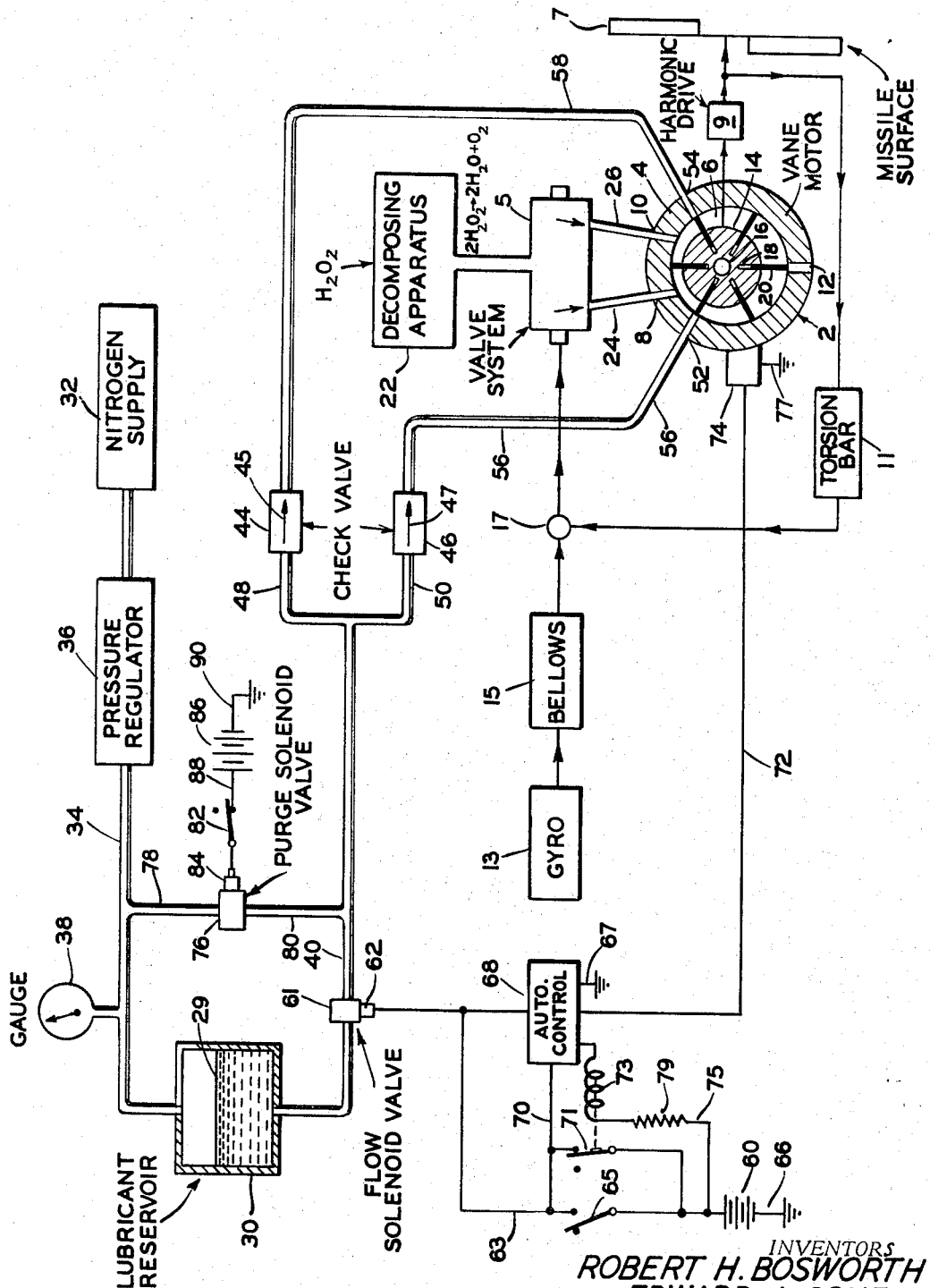

ABSTRACT OF THE DISCLOSURE

Apparatus for lubricating a gas propelled motor having a high pressure gas intake side and a low pressure exhaust side. A lubricant is pressurized in a container so as to flow to the motor and check valves are provided for restricting lubricant flow to the low pressure side of the motor and for preventing transmission of pressure from the high pressure side of the motor to the container. The flow of lubricant is manually controlled or automatically controlled in response to the predetermined ambient temperature of the motor.

This invention relates to means for lubricating gas vane motors, and more particularly to means for introducing a lubricant into these motors, when such motors are operating below a predetermined ambient temperature.

A gas vane motor such as may be used in the system of the copending U.S. application Ser. No. 351,367, filed Mar. 12, 1964, by Robert H. Bosworth and assigned to the Bendix Corporation, now U.S. Patent No. 3,223,364, to which the novel means embodied in the present invention is applied by way of example, is propelled by superheated steam and oxygen, the decomposition products of hydrogen peroxide, with the heat released from said decomposition being measured at approximately 1350 degrees Fahrenheit. The decomposition equation may be written as follows:

(1) $$2H_2O_2 \rightarrow 2H_2O + O_2 + \Delta$$

where $\Delta$ represents heat in this chemical equation.

Due to this heat of decomposition and the running conditions of the motor, the ambient temperature around the motor can vary up to 1400 degrees Fahrenheit. When the ambient temperature exceeds 100 degrees Fahrenheit, the motor becomes a self-lubricating device. That is, the oxides being formed within the motor provide for the necessary lubricating porperties. At these temperatures, therefore, the motor will run freely without the introduction of another lubricant.

When the ambient temperature reaches levels below 1000 degrees Fahrenheit, these oxides will not form at a rate sufficient to provide the necessary lubrication, and lubrication by other means must then be introduced. The means embodied in the present invention for introducing lubricant into a motor as described herein employs nitrogen under pressure applied to a reservoir containing the lubricant. The pressurized lubricant is thus forced through the lubricating system, through check valves, and ultimately to the motor through pressure taps. A solenoid valve, which can be manually operated is provided to commence the flow of lubricant through the system. Automatic control means may be coupled to the solenoid valve to provide a "make" or "break" in the solenoid valve circuit depending on temperature, and the desired length of time of the lubrication injection period, thus automatically controlling lubricant flow. The automatic control means may utilize a thermocouple to sense a predetermined temperature, to automatically open or close the solenoid valve circuit for a preselected period of time at this temperature.

The lubricant used in the present invention is a colloidal suspension of graphite in water. This type of lubricant is particularly advantageous when used at high temperatures, forming harmless carbon dioxide as a decomposition product such as shown by the following equation:

(2) $$C + O_2 \rightarrow CO_2$$

Other lubricants leave harmful abrasive compounds when decomposed. Although graphite will not dissolve in water, the aforenoted colloidal suspension is of such a nature to overcome this objection.

The lubricant is supplied to the motor by way of a pressure differential created within the motor. This pressure differential is established by introducing a supply of propellent to one side of the motor in accordance with the desired direction of rotation. The propellent intake side of the motor will develop a higher pressure than the other side, this other side being the recompression exhaust side of the motor. The pressure imposed upon the lubricant is such as to exceed the pressure developed on the recompression exhaust side of the motor, thus permitting the lubricant to enter the motor on this exhaust or low pressure side. When the rotation of the motor changes so will the pressure configuration in relation to the two sides of the motor change. Thus, if it is desired to change the direction of rotation of the motor, as it is for a servo mechanism application, the lubricant is alternately injected into one side and then the other side, each side alternately experiencing the low pressure. Since the lubrication injection period is of short duration compared to the noninjection period, the cooling effect of the lubricant on the motor is negligible. This is a desired condition since a cooling effect would produce an unwanted reduction in the internal energy of the propellent.

One object of this invention is to provide means for introducing lubricant to a gas vane motor when the motor is operating at an ambient temperature below which the motor is not self lubricating.

Another object of this invention is to introduce lubricant to a gas vane motor, the lubricant being a colloidal suspension of graphite in water.

Another object of this invention is to provide a system for introducing lubricant to a chamber having a pressure differential with the arrangement being such that the lubricant enters the low pressure side of the chamber and the transmission of pressure from the high pressure side is prevented.

Aother object of this invention is to provide means for injecting lubricant into a gas vane motor, and to control said injection manually or automatically in response to the ambient temperature of the motor.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In reference to the drawing, the single figure shown is a diagrammatic view of a vane motor and the apparatus necessary to introduce a lubricant into the motor.

In reference to the figure, a gas van motor 2 has a housing 4 and a displacement chamber 6, with propellent intake ports 8 and 10, an exhaust port 12, and pressure taps 52 and 54. The ports 8, 10, and 12 and the taps 52 and 54 extend through the housing 4 and into the displacement chamber 6.

A rotor 14 is mounted eccentric to the displacement chamber 6 by the shaft 16. A plurality of slots 18 are formed to extend longitudinally along the rotor 14, and a vane 20 is provided for each slot, the vanes 20 being slidable radially in the slots 18.

The vane motor 2 is powered by superheated steam and oxygen, the decomposition products of hydrogen peroxide. A decomposing apparatus 22 accomplishes this decomposition in a conventional maner such as shown, for example, by the copending U.S. application Ser. No. 351,367, which may employ a silver screen to act as a catalyst. The hydrogen peroxide will decompose upon contact with the catalyst with the temperature resulting from the decomposition being in the nature of 1350 degrees Fahrenheit.

The decomposition products so produced are directed through suitable piping 24 and 26 to the compression chamber 6 through either one of the intake ports 8 and 10 of the vane motor 2, depending on the desired direction of rotation of the rotor 14 of the motor 2. In a servo mechanism application, for example, where the direction of rotation of the rotor 14 is alternately changing, a valve system 5, which may be of a type disclosed in greater detail and claimed in the U.S. application Ser. No. 351,367 is employed to permit the introduction of propellent through one and then the other of the ports 8 and 10 of the motor 2 in alternate cycles.

In such an application, the motor 2 and the valve system 5 are included in a closed loop servo mechanism system and the motion required to operate the valve system 5 may be evolved through a feedback means. The vane motor 2 may be used to actuate a missile or aircraft surface 7 by coupling the output torque of the motor 2 at the rotor 14 to a harmonic drive device 9, with the missile surface 7 suitably linked to the harmonic drive device 9. The output torque evolved by the motor 2 may further be coupled to converting means such as a torsion bar system 11 which may be of a type disclosed in greater detail and claimed in the U.S. application Ser. No. 351,367 which will act to convert the torque into a feedback displacement related to the displacement of the missile surface 7. An input signal from a command device such as a gyroscope 13 may be converted to a similar displacement through a bellows 15, which may be of a type disclosed in greater detail and claimed in the U.S. application Ser. No. 351,367, and the feedback and input displacements summed through a suitable mechanical linkage at a point 17. The displacement error resulting from this summation may be used to actuate the valve system 5, which will permit propellent flow to either one of the ports 8 and 10 of the motor 2, depending on the sense or direction of the displacement error.

The ambient temperature around the motor 2 can vary up to 1400 degrees Fahrenheit depending on a variety of factors including the temperature of the hot gas as it enters the ports 8 and 10 and the environment in which the motor 2 is used. At temperatures above 1000 degrees Fahrenheit, the motor 2 is self-lubricating. Since the housing 4 may be made of a material having ferrous elements, the oxygen formed upon the decomposition of the hydrogen peroxide (see Equation 1) is sufficient to react with these ferrous elements to form oxides having lubricating properties. At temperatures below 1000 Fahrenheit, these oxides will not form at a sufficient rate and an external lubricant must be introduced to the relatively moving elements of the motor 2 to prevent stalling thereof. It is this condition that the means embodied in the present invention has been utilized to overcome.

A lubricant 29, used in this novel means, is the colloidal suspension of graphite in water, originally having a consistency of a paste, but diluted with water, ten to twenty times by volume. Although graphite will not dissolve in water, this objection is overcome by the nature of the colloidal suspension employed. Moreover, the colloidal graphite will not leave objectionable residues at high temperatures. The product of combustion is harmless carbon dioxide which will leave the motor through the exhaust port 12 and whichever of the ports 8 and 10 that acts as a decompression exhaust port. The lubricant used may be that supplied by the Acheson Colloids Co., Port Huron, Mich., and designated as their product "Aquadag," or a material having similar characteristics.

In reference to the figure, the lubricant 29 may be contained in a reservoir 30 and pressurized by a compressed gas supply 32, shown by way of illustration as being nitrogen, through suitable piping 34. A pressure regulator 36, of a conventional type, may be provided to adjust the pressure of the gas supply 32 to a level usable within the system, and a gauge 38, also of a conventional type, may be included to monitor the pressure level just prior to the entry of the gas into the reservoir, and to detect deviations from a prescribed pressure level.

The lubricant 29, under pressure, is forced through suitable piping 40 to check valves 44 and 46. The check valves 44 and 46, which may be of a conventional type assembled in the system as shown by arrows 45 and 47, are coupled to the piping 40 by suitable piping 48 and 50, and to pressure taps 52 and 54 through suitable piping 56 and 58 connecting the check valves 44 and 46 with the pressure taps 52 and 54. A solenoid valve 61 is included between the reservoir 30 and the check valves 44 and 46. The solenoid valve 61, which provides a "start" and "stop" control of the flow of the lubricant 29 from the reservoir 30, may be actuated by manually operating a switch 65. The switch 65 couples a solenoid 62 of the solenoid valve 61 to a direct current power supply 60, grounded by a conductor 66, through a conductor 63.

Alternatively the solenoid valve 61 may be actuated by an automatic thermo-sensitive control device 68 through an output conductor 70 of the automatic control device 68, said device being grounded by a conductor 67, which will automatically permit lubricant flow for a predetermined period of time. An output conductor 72 of a heat sensing means such as a thermocouple 74, grounded by another output conductor 77, may be coupled to the automatic control means 68. The thermocouple 74, at a preselected motor ambient temperature, will actuate the control device 68 to open or close a switch 71 through a relay 73 to operate the solenoid 62 of the solenoid valve 61. The relay 73 is connected to the power supply 60 through the conductor 75 and resistor 79. The actuating temperature may be, for example, 1000 degrees Fahrenheit, at which temperature the flow of the lubricant 29 from the reservoir 30 will commence for the predetermined period of time.

A purge solenoid valve 76 is provided between the nitrogen supply piping 34 and the lubricant flow piping 40, being coupled by piping 78 to piping 34 and by piping 80 to piping 40. The valve 76 will initiate the flow of pressurized nitrogen throughout the system when it is necessary to purge the system to insure that no graphite particles from the lubricant 29 have accumulated to restrict the flow of the lubricant 29 throughout the system. The purge solenoid valve 76 may be actuated by manually operating the switch 82. The switch 82 couples a solenoid 84 of the purge solenoid valve 76 to a direct current power supply 86, grounded by a conductor 90, through a conductor 88. The solenoid valve 61 and the solenoid valve 76 should be of the type so as not to transmit any back pressure which may be experienced in the system.

In reference to the figure, let it be assumed that the ambient temperature about the motor 2 is below 1000 degrees Fahrenheit, and this temperature is sensed by the thermocouple 74. The manually operable switch 65 is open and the automatic control device 68, cooperating with the thermocouple 74, will actuate the switch 71 through the relay 73 causing the solenoid 62 of the flow solenoid valve 61 to be energized by the power supply 60 which is connected to the relay 73 through the conductor 75 and the resistor 79. The lubricant 29 will be thus caused to flow from the reservoir 30 and through the piping 40 for a predetermined period of time. When the lubricant 29 approaches the check valves 44 and 46 through the piping 48 and 50, one of the pressure taps 52 and 54 of the motor 2 will be under a higher pressure than the other, depending on the direction of rotation of the rotor 14 of the motor 2, since one of the taps 52 and 54 is on the propellent intake side of the motor while the other is on the recompression exhaust side. This pressure differential will be reversed as the direction of rotation of the rotor 14 reverses.

Let it be further assumed that the propellent enters the displacement chamber 6 of the motor 2 through the port 10, thus making the port 8 a recompression exhaust port. The side of the motor 2 having the port 10 and the tap 54 will thus be under high pressure, 450 p.s.i., for example, while the other side of the motor 2 having the port 8 and the tap 52 will be under a low pressure, 50 p.s.i., for example. Under these conditions, the rotor 14 of the motor 2 will rotate in a clockwise direction.

If the lubricant 29 in the reservoir 30 has been pressurized to 200 p.s.i., for example, the lubricant 29 will pass through the check valve 46 to the displacement chamber 6 of the motor 2, through the piping 56 and the low pressure tap 52, at a pressure of 200 p.s.i. minus 50 p.s.i. or 150 p.s.i. The high pressure, 450 p.s.i., on the intake side of the motor 4 is transmitted back to the check valve 44, thus preventing the lubricant 29, under a pressure of 200 p.s.i., from flowing to the intake side of the motor 2. The check valve 44 will also respond to the high pressure and prevent this pressure from backing up into the lubricating system causing damage thereto. If the motor 2 constantly changes direction, as it does in a servo mechanism application, the pressure configuration will alternate from one side of the motor 2 to the other side, and the lubricant will be alternately injected through the taps 52 and 54 on opposite sides of the motor 2, thus insuring thorough lubrication of the relatively moving parts thereof.

In summary, the novel means embodied in the present invention provides for the injection of a colloidal graphite lubricant into the displacement chamber of a gas vane motor, with the temperature inside the vane motor allowing the lubricant to enter the displacement chamber of the motor as graphite particles suspended in steam. The nature of the graphite in colloidal suspension renders the lubricant harmless to the system.

The direction of rotation of the motor will vary from clockwise to counterclockwise, depending on which side of the displacement chamber the decomposed hydrogen peroxide propellent is permitted to enter. The entry of the propellent into the displacement chamber may be controlled by servo operated valves, allowing the propellent to alternately enter first one side, and then the other side of the motor. The intake side of the motor will be under a high pressure, while the other side, being the recompression exhaust side, will experience a low pressure.

The lubricant, under a predetermined pressure, is injected into the displacement chamber through taps on either side of the motor, one tap on the intake side and the other tap on the recompression exhaust side. The lubricant will enter the displacement chamber on the low pressure or recompression exhaust side, with the high pressure experienced on the intake side backing up to a check valve, thus preventing lubricant flow to the high pressure side of the motor. If the direction of rotation of the motor is alternately reversed, therefore, the lubricant will be alternately injected, first to one side and then the other side of the compression chamber.

The present invention, then, provides a novel and useful means for introducing a noncontaminating lubricant, capable of withstanding high temperatures, into a motor of the type described, while not sacrificing the efficiency of the motor. The required lubricant is introduced to the motor in an economical, uncomplicated and efficient manner.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Lubricating means for use with a gas propelled rotating device, said rotating device including a housing, a rotor rotatably mounted within said housing and a chamber encircling said rotor, said rotor having longitudinal extending slots, radially slidable vanes carried within the slots of said rotor, propellent intake ports extending through said housing to said displacement chamber and arranged on either side thereof, means operable to control the injection of the propellent into the displacement chamber so that said propellent alternately enters one and then the other of said ports to cause alternate reversing of the direction of rotation of said rotor, said propellent causing said entering side to be under a high pressure and said other side to be under a low pressure, pressure taps extending through said housing to said displacement chamber and arranged on either side thereof, said lubricating means comprising a container for lubricant, means to pressurize the lubricant in the container, said pressurizing means including a regulator to adjust said pressure to a predetermined level and a gauge to insure the maintenance of said level, a lubricant flow control device having a valve, automatic control means in cooperative arrangement with said valve, means responsive to a predetermined ambient temperature of said rotating device so as to actuate said valve at said temperature to permit lubricant flow for a predetermined period of time, suitable piping connecting the container to said pressure taps, check valves responsive to the pressures within said rotating device, said lubricant being pressurized to a degree so as to enter said displacement chamber through the check valve and pressure tap on said low pressure side of said rotating device, and said lubricant alternately entering the compression chamber first from one side and then the other side of said chamber as the direction of rotation of said rotor alternately reverses.

2. Lubricating means for use with a device including gas propelled rotating means and means to provide said rotating means with a high pressure side and a low pressure side, said lubricating means comprising, means to contain a lubricant, piping to connect said containing means to said rotating device, means to control the flow of said lubricant through said piping, means to restrict the flow of said lubricant to the low pressure side of said rotating device, and means to prevent the high pressure from said high pressure side from backing up into said lubricating means.

3. The combination defined by claim 2 in which said means to control the flow of said lubricant includes an electrically controlled flow valve on the outlet side of said lubricant containing means, a power supply, a switch coupling said power supply to said valve so that the manual operation of said switch will actuate said valve to cause the flow of said lubricant, automatic control means coupled between said power supply and said valve, and sensing means in cooperative arrangement with said control means responsive to a predetermined ambient temperature of said rotating device to automatically operate said valve at said predetermined temperature to control the flow of lubricant through said flow control valve.

4. The combination defined by claim 2 in which said means to restrict the flow of said lubricant to the low pressure side of said rotating device includes pressurizing means to pressurize said lubricant to a pressure higher than that on the low pressure side but lower than that on the high pressure side of said rotating device, and in which said means to prevent the high pressure from said high pressure side from backing up into said lubricating means includes a check valve responsive to said high pressure so as to prevent the transmission of said high pressure.

5. Lubricating means for use with a gas propelled motor having a high pressure propellent intake side and a low pressure recompression exhaust side, said lubricating means comprising means for containing a pressuribed lubricant, means for conveying said lubricant, control means for controlling the flow of said lubricant through said conveying means, and means for connecting the conveying means to the motor and to restrict the flow of said lubricant to the low pressure side of said motor.

6. Lubricating means for use with a vane motor having a hot gas propellent, said motor including a housing, a rotor rotatably mounted within said housing, a displacement chamber encircling said rotor, means to inject said propellent into said displacement chamber, a shaft within said housing to eccentrically mount said rotor in relation to said displacement chamber, propellant intake ports on either side of said motor and extending through said housing and into said displacement chamber and arranged in relation to said rotor so that injection of the propellent through one of said ports will cause clockwise rotation of said rotor, with counterclockwise rotation of said rotor resulting from the injection of said propellent through the other of said ports, control means to cause alternate injection of said propellent through one and then the other of said ports so that a high pressure results on the side of said motor receiving said propellent and a low pressure results on said other side, said housing having pressure taps extending through to said displacement chamber and on either side thereof so as to be responsive to said high pressure and said low pressure, said pressure taps connecting said lubricating means to said motor, said lubricating means including a container for lubricant, means to apply a pressure to said lubricant in the container, means responsive to said pressure so as to regulate said pressure, piping means to connect the container to said pressure taps, valve means to control the flow of said pressurized lubricant through said piping means, and check valves at each of said pressure taps to permit the flow of said lubricant through said low pressure responsive tap and to prevent the backing up of said high pressure through said high pressure responsive tap, the injection of said lubricant alternating from one side of the displacement chamber to the other, and on the side opposite to that on which said propellent is injected.

7. Lubricating means for a device having an element rotating within a chamber, comprising means for creating a pressure differential within the chamber to rotate the element, a container for lubricant, means for applying pressure to the lubricant in the container, and means connecting the container to the chamber including means for controlling the flow of lubricant from the container to the chamber and means responsive to the pressure differential within the chamber to provide lubricant flow to the low pressure side of the chamber and to prevent transmission of pressure from the high pressure side of the chamber to the container.

8. Lubricating means for a device having an element rotating within a chamber, comprising means for creating a pressure differential within the chamber to rotate the element, a container for lubricant, means for applying pressure to the lubricant in the container, and means connecting the container to the chamber including means responsive to the pressure differential within the chamber to provide for lubricant flow to the low pressure side of the chamber and to prevent transmission of pressure from the high pressure side of the chamber to the container.

9. Lubricating means for use with a system including a motor having an element rotating within a chamber and means for creating a pressure differential within the chamber, comprising a container for lubricant, means for applying pressure to the lubricant in the container, and means connecting the container to the chamber including means for controlling the flow of lubricant from the container to the chamber and means responsive to the pressure differential within the chamber to restrict lubricant flow to the low pressure side of the chamber.

10. Lubricating means for use with a system including a motor having an element rotating within a chamber and means for creating a pressure differential within the chamber to rotate the element, comprising a container for lubricant, means for applying pressure to the lubricant in the container, means connecting the container to the chamber including means responsive to the pressure differential within the chamber to provide lubricant flow to the low pressure side of the chamber and to prevent transmission of pressure from the high pressure side of the chamber to the container, and means for removing accumulated lubricant from the connecting means.

11. Lubricating means for use with a system including a gas propelled motor having an element rotating within a chamber and means for controlling the flow of propellent to the motor so that the propellent alternately enters one side of the chamber and then the opposite side to reverse the direction of rotation of said element, with said means affecting the chamber so that the propellent entering side is under a high pressure and the other side is under a low pressure, the lubricating means comprising a container for lubricant, means for applying pressure to the lubricant in the container, and means connecting the container to the chamber including means responsive to the pressure within the chamber for restricting lubricant flow to the low pressure side of the chamber so that the lubricant enters the side of the chamber opposite to the propellent entering side when the direction of rotation of the element reverses.

References Cited

UNITED STATES PATENTS

| 2,048,323 | 7/1936 | Cutts | 184—7 |
| 2,284,799 | 6/1942 | Brownstein | 184—7 |

FOREIGN PATENTS

| 706,503 | 5/1941 | Germany. |
| 1,022,059 | 1/1958 | Germany. |
| 1,094,280 | 10/1967 | France. |

LAVERNE D. GEIGER, *Primary Examiner.*

H. S. BELL, *Assistant Examiner.*